United States Patent [19]
Chopin et al.

[11] Patent Number: 6,090,743
[45] Date of Patent: *Jul. 18, 2000

[54] DISPERSIBLE RARE EARTH COMPOSITIONS AND COLLOIDAL SUSPENSIONS/CATALYSTS COMPRISED THEREOF

[75] Inventors: Thierry Chopin, Saint-Leu la Foret; Olivier Touret, la Rochelle, both of France; Gabriel Vilmin, Princeton, N.J.

[73] Assignee: Rhone-Poulenc Chimie, Courbevoie Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/452,856

[22] Filed: May 30, 1995

[30] Foreign Application Priority Data

May 27, 1994 [FR] France .................... 94 06448

[51] Int. Cl.⁷ .................................... B01J 23/00
[52] U.S. Cl. ............................ 502/302; 502/304
[58] Field of Search ..................... 502/302, 304

[56] References Cited

U.S. PATENT DOCUMENTS

| | | | |
|---|---|---|---|
| 5,006,318 | 4/1991 | Demazean et al. | 423/21.1 |
| 5,021,192 | 6/1991 | David et al. | 252/313.1 |
| 5,132,048 | 7/1992 | Picard-Seon et al. | 252/313.1 |
| 5,280,002 | 1/1994 | Bonneau et al. | 502/202 |
| 5,688,439 | 11/1997 | Chopin et al. | 252/309 |

FOREIGN PATENT DOCUMENTS

| | | |
|---|---|---|
| 0238367 | 9/1987 | European Pat. Off. . |
| 0239479 | 9/1987 | European Pat. Off. . |
| 0433133 | 6/1991 | European Pat. Off. . |
| 0517554 | 12/1992 | European Pat. Off. . |
| 2413122 | 7/1979 | France . |

*Primary Examiner*—John F. Niebling
*Assistant Examiner*—Alexander G. Ghyka
*Attorney, Agent, or Firm*—Burns, Doane, Swecker & Mathis, L.L.P.

[57] ABSTRACT

Colloidal dispersions of finely divided particulates, well suited for the production of catalysts for the catalytic conversion of exhaust gases emanating from internal combustion engines, notably vehicular exhaust gases, comprise at least one rare earth compound and, optionally, at least one compound of at least one other element selected from among those of groups IVa, VIIa, VIII, Ib, IIb, IIIb and IVb of the Periodic Table, said particulates being at least 50% dispersible in water.

34 Claims, No Drawings

DISPERSIBLE RARE EARTH COMPOSITIONS AND COLLOIDAL SUSPENSIONS/CATALYSTS COMPRISED THEREOF

BACKGROUND OF THE INVENTION

1. Technical Field of the Invention

The present invention relates to water-dispersible compositions based on at least one rare earth, as well as the procedure for the preparation thereof.

This invention also relates to colloidal suspensions produced from such compositions and to catalysts manufactured therefrom.

2. Description of the Prior Art

It is known to this art that catalysts can be in the form of carriers, such as a heat-resistant ceramic unitary shaped article or monolith, or a metallic substrate, coated with a coating typically comprising a material that provides a porous layer, such as alumina, titanium, or zirconia, and catalytically active elements, such as precious metals and other elements, for example metallic oxides and, more especially, rare earth oxides, in particular cerium oxide or zirconium oxide, which may impart a catalytic function itself and/or a carrier function for precious metals. This coating is typically referred to as a "washcoat."

To prepare this coating, suspensions or colloidal solutions of the other metallic elements, such as cerium or zirconium oxide, are, for example, mixed with alumina. The quality of the coating prepared will be dependent, in particular, on the amount of the mixture thus formed, and the quality of such mixture will increase as readily dispersible materials become available, namely, materials that can, when dispersed in water, provide suspensions that are sufficiently stable and concentrated to be used for the formulation of such mixtures.

Serious need thus exists in this art for dispersible compositions that can be used to prepare catalysts.

Furthermore, an increasingly pronounced trend also exists in this art to incorporate elements in catalytic compositions, no longer in separate, uncombined form, but, to the contrary, directly in the form of solid solutions thereof. This is the case most notably with respect to cerium and zirconium. In this instance also, there is a great need for products that comprise solid solutions.

SUMMARY OF THE INVENTION

Accordingly, a major object of the present invention is the provision of novel rare earth compositions which exhibit enhanced dispersibility in water and which are well suited for the production of colloidal dispersions/catalysts therefrom.

Another object of this invention is the provision of novel rare earth compositions that are precursors of solid solutions thereof.

Briefly, the present invention features novel rare earth compositions that are readily dispersible in water and which are conveniently prepared via the technique comprising the following steps:

(a) preparing a solution or suspension containing at least one rare earth acetate or chloride, (b) contacting said solution or suspension with a basic medium, and maintaining the reaction medium thus formed at a basic pH, and (c) recovering the precipitate which forms by atomization or freeze-drying.

DETAILED DESCRIPTION OF BEST MODE AND PREFERRED EMBODIMENTS OF THE INVENTION

More particularly according to the present invention, in one embodiment thereof, rare earth compositions are prepared comprising at least one rare earth and at least one other element selected from among those of groups IVa, VIIa, VIII, Ib, IIb, IIIb, and IVb of the Periodic Table, by (a) intimately admixing at least one acetate or chloride of said rare earth with at least one salt or colloidal solution of said other element, (b) contacting the liquid medium thus formed with a basic medium, and maintaining the reaction medium thus constituted at a basic pH, and (c) recovering the precipitate which forms by atomization or freeze-drying.

Moreover, the present invention also features compositions based on at least one rare earth and, optionally, at least one other element selected from among those of groups IVa, VIIa, VIII, Ib, IIb, IIIb, and IVb of the Periodic Table, and exhibiting a dispersibility in water of at least 50%.

Too, this invention also features colloidal suspensions of compositions comprising at least one rare earth, and, optionally, at least one other element selected from among those of groups IVa, VIIa, VIII, Ib, IIb, IIIb, and IVb of the Periodic Table, the size of the colloids of which being at most 10 nm, and more preferably at most 5 nm, and the nitrate content of which being at most 1,000 ppm.

In addition, the present invention features novel catalytic compositions comprising a carrier and at least one rare earth oxide, said at least one rare earth oxide being distributed homogeneously in the carrier and being present as particulates having a particle size of at most 5 nm.

In another embodiment of the invention, the subject catalytic compositions comprise a carrier, at least one rare earth oxide, and at least one second oxide selected from among other rare earth oxides and the oxides of the elements of groups IVa, VIIa, VIII, Ib, IIb, IIIb, and IVb of the Periodic Table, said oxides being distributed uniformly and juxtaposed in said carrier.

This invention thus also features catalysts prepared from the compositions or suspensions described above, especially catalysts for the treatment or conversion of vehicular exhaust gases.

The compositions according to the invention disperse well, both in water, thereby providing stable, concentrated suspensions, and in carrier substrates, such as alumina, which are used to manufacture catalyst washcoats. Also, in addition to good dispersibility, they present the advantageous property of having a very low nitrate content. Thus, during the preparation of catalysts therefrom, there is no release of nitric oxides ($NO_x$) during the calcination step. Hence, it is not necessary to provide specific means for removing the $NO_x$ in the catalyst-preparation apparatus.

Moreover, when based on at least two rare earths, or at least one rare earth and one other element, the compositions according to the invention may comprise solid solutions thereof.

By the term "rare earth" are intended yttrium and the elements of the Periodic Table having an atomic number ranging from 57 to 71, inclusive. The Periodic Table is that published in the Supplement to the *Bulletin de la Société Chimique de France*, No. 1 (January 1966).

The process for the preparation of the compositions according to the invention will now be more fully described.

The first step of the process entails preparing, typically as a solution or suspension, the constituent or mixture of constituents defining the subject compositions. This solution or suspension contains a rare earth acetate or chloride and, optionally, at least one salt or colloidal solution of another element selected from among those of groups IVa, VIIa, VIII, Ib, IIb, IIIb, and IVb of the Periodic Table. In the remainder of the description of this first step and of the following step comprising contact with a basic medium, and for the purpose of simplification, the term "mixture" is employed to designate the solution or suspension of the element or mixture of elements defining the subject compositions.

The rare earth is preferably selected from among cerium, yttrium, neodymium, gadolinium, and praseodymium. Cerium, yttrium and praseodymium are the preferred rare earths when the compositions of the invention are used in catalysis.

As regards the other elements, most notably exemplary thereof are zirconium, iron, copper, manganese, gallium, and palladium.

The salts employed are preferably the acetates for the rare earth(s). As regards the other element(s), suitable salts include the chlorides or the salts of carboxylic acids, such as the acetates, oxalates, and formiates. An acetate is preferred, when possible.

The next step comprises contacting the above mixture with a basic medium. By the term "basic medium" is intended any medium having a pH exceeding 7. The basic medium is typically an aqueous solution containing a base. In particular, hydroxides are employed as the base, notably alkali or alkaline earth metal hydroxides. Secondary, tertiary, or quaternary amines can also be used. Nevertheless, the amines and liquid ammonia are preferred, since they reduce the risks of pollution caused by alkali or alkaline earth metal cations. Urea can also be used. Lastly, in the event of preparation of a cerium- or zirconium-based composition utilizing a cerium chloride, the bases indicated above are used, preferably while avoiding the carbonates and hydroxycarbonates.

Contacting of the aforesaid mixture with the basic medium is carried out under conditions such that the pH of the reaction medium formed thus remains basic.

Preferably, this pH value will be at least 9 and preferably is at most 11. More preferably, the pH ranges from 9.5 to 11.

The above mixture and the basic medium are contacted with each other, for example by adding the mixture to the basic medium. It is also possible to provide this contact continuously, the pH condition being fulfilled by adjusting the respective flow rates of the mixture and of the basic medium.

In a preferred embodiment of the invention, the process is carried out under conditions such that, when the mixture is contacted with the basic medium, the pH of the reaction medium thus formed is maintained constant. These conditions can be attained by adding an additional amount of base to the mixture prepared at the time the mixture is added to the basic medium.

This contacting step is advantageously carried out at ambient temperature.

The reaction forms a precipitate or suspension which can be separated, if necessary, from the reaction mixture via any conventional technique. The separated product can be washed.

The subsequent drying or, more generally, the recovery and collection of the precipitate, is carried out by spraying or freeze-drying.

In another preferred embodiment of the invention, the separation of the precipitate from the reaction medium and the drying thereof is effected by spraying i.e., by spraying the mixture into a heated atmosphere (spray-drying). The spraying may be carried out using any conventional sprayer, e.g., a spray nozzle of the spraying rose type, or other device. A so-called turbine atomizer may also be used. As regards the various spraying techniques that can be employed, see the basic text by Masters, *Spray-Drying* (Second Edition, 1976, George Godwin, London).

It will be appreciated that spray-drying employing a "flash" vessel can also be carried out, e.g., the vessel described, in particular, in French Patent Applications Nos. 2,257,326, 2,419,754, and 2,431,321, each assigned to the assignee hereof. In this event, the treatment gases (hot gases) downwardly descend in a helicoidal trajectory and converge into a vortex. The mixture to be dried is injected along a path merging with the axis of symmetry of the helical pathways of said gases, thereby completely transferring the momentum from the gases to the mixture to be treated. The gases thus perform a dual function: first, the spraying function, that is, the transformation of the initial mixture into fine droplets, and, second, the drying of the droplets produced. Moreover, the extremely short retention time (normally less than about $1/10$ of a second) of the particles in the vessel presents the advantage, among others, of reducing any risks of overheating as a consequence of an excessively lengthy contact with the hot gases.

Depending on the respective flow rates of the gases and the mixture to be dried, the inlet temperature of the gases ranges from 400° to 900° C., and preferably from 600° to 800° C. The temperature of the dry solids ranges from 110° to 250° C., and preferably from 125° to 200° C.

With respect to the flash vessel indicated above, particularly exemplary thereof is that shown in FIG. 1 of French Patent Application No. 2,431,321.

This vessel comprises a combustion chamber and a contact chamber incorporating a double cone or a tapered cone whose upper end flares outward. The combustion chamber communicates with and empties into the contact chamber through a narrowed passage.

The upper end of the combustion chamber is provided with an opening allowing introduction of the combustible phase.

In addition, the combustion chamber comprises an internal coaxial cylinder which delimits within the chamber a central zone and an annular peripheral zone that is perforated, most of the apertures of which being located in the upper end of the apparatus. The chamber comprises a minimum of six holes circumscribed over at least one circle, but preferably over several circles spaced apart axially. The total surface area of the holes or apertures arranged in the lower end of the chamber can be very small, i.e., about $1/10$ to $1/100$ of the total surface area of the openings in said internal coaxial cylinder.

The apertures are normally circular and are very thin. Preferably, the ratio of the diameter of the holes to the thickness of the wall is at least 5, the minimum thickness of the wall being limited only by mechanical constraints.

Lastly, a bent tube empties into the narrowed passage, and one end of this tube opens into the axis of the central zone.

The gaseous phase propelled in a helical motion (hereinafter termed helical phase) is composed of a gas, generally air, which is introduced into an orifice in the annular zone. This orifice is preferably located in the lower end of said zone.

To produce a helical phase in proximity to the zone of narrowed or restricted passage, the gaseous phase is preferably introduced under low pressure into the aforesaid orifice, that is, under a pressure of less than 1 bar, and, more particularly, at a pressure ranging from 0.2 to 0.5 bar above the pressure existing in the contact chamber. The velocity of this helical phase typically ranges from 10 to 100 m/s, and preferably from 30 to 60 m/s.

Moreover, a combustible phase, which may, in particular, be methane, is injected axially through the aforesaid opening into the central zone at a speed of approximately 100 to 150 m/s.

The combustible phase is ignited by any conventional means in the area in which the fuel and the helical phase are in contact with each other.

Thereafter, the forced flow of the gases into the zone of narrowed passage occurs along a set of paths merging with the generatrix of a hyperboloid. These generating lines rest on a group of circles having small-size rings located near and below the narrowed passage, before diverging in all directions.

Next, the mixture to be treated is introduced in liquid form through the aforementioned tube. The liquid is then fractionated into a multitude of droplets, each of which is transported by a unit volume of gas and subjected to a movement generating a centrifuge effect. Normally, the flow rate of the liquid ranges from 0.03 to 10 m/s.

The ratio between the amount of momentum inhering in the helical phase and that of the liquid mixture must be high, i.e., at least 100 and preferably ranging from 1,000 to 10,000. The amounts of momentum in proximity to the narrowed passage are calculated as a function of the inlet flow rates of the gas and of the mixture to be treated, as well as the cross-section of this passage. Increasing the flow rates enlarges the size of the droplets.

Under these conditions, the momentum of the gases itself is imparted, as regards direction and intensity, to the drops in the mixture to be treated, these drops being separated from each other in the area in which the two currents converge. The velocity of the liquid mixture is, moreover, reduced to the minimum required to provide a continuous flow.

Following the drying and/or separation step, a composition according to the invention is obtained, which will now be more fully described.

A composition based solely on rare earths is an amorphous product based on rare earth oxides or oxyhydroxides and on anions of the rare earth precursor. It may exist as a kernel containing at least one rare earth oxide or oxyhydroxide, or an oxyhydroxyacetate surrounded by anions from the rare earth precursor. A composition based on a rare earth and another element also contains an oxide or oxyhydroxide of the rare earth and of the other element and anions of the precursors. It may also exist as a kernel based on at least one rare earth oxide or oxyhydroxide, or an oxyhydroxychloride or oxyhydroxyacetate surrounded by anions from the rare earth precursor, it being understood that it is possible to exist as a mixed oxide or oxyhydroxide containing the rare earth and the other element. For example, in the specific case of a cerium- and zirconium-based composition prepared from cerium acetate, the composition comprises a kernal based on at least one oxide and one oxyhydroxide of cerium and zirconium surrounded by acetate anions.

As regards the respective proportions of the elements comprising the compositions according to the invention, when at least one rare earth and an element other than a rare earth are present, the proportion of rare earth is preferably at least 50%, and more preferably at least 70% by weight of the total weight of all elements, expressed as the oxides thereof.

A principal advantage of the compositions according to the invention is their dispersibility in water, which is at least 50%, and more preferably at least 60%, and 80% in the unique case of dispersion in acidified water.

Dispersibility is the ratio (P1–P2)/P1 expressed in percent, P1 being the initial weight of the product placed in suspension in water, and P2 is the weight of the residual dry precipitate obtained after centrifugation of the suspension preliminarily produced, separation of the mother liquors and of the precipitate, and drying of the latter. Dispersibility in acidified water is given in the same manner, but is based on a suspension having a pH of 4.

Another advantage of the compositions according to the invention is their low nitrate content. This content by weight is at most 1,000 ppm, and preferably at most 200 ppm, and even more preferably a maximum of 100 ppm.

Another characteristic of the compositions according to the invention is their chemical homogeneity. Indeed, the compositions containing at least one rare earth and at least one other element selected from among those of groups IVa, VIIa, VIII, Ib, IIb, IIIb, and IVb exhibit a chemical homogeneity such that the heterogeneity ranges are less than 10 $nm^2$. This connotes that, in the constituents of the compositions according to the invention, there is no difference between 10 $nm^2$ surface areas.

These homogeneity characteristics are determined by MET-EDS analysis. More specifically, the heterogeneity range was measured using the Energy Dissipation Spectroscopy (EDS) mapping method, by using an Electron Transmission Microscopy (MET) electron probe.

The granulometry of the compositions according to the invention may vary as a function of the drying technique, in particular. It may range from 1 to 10 $\mu$m. All of the sizes reported here and in the description that follows are average sizes.

In the more particular case of compositions based entirely or principally on cerium, the maximum size of the crystallites is 4 nm. This measurement is made using X-ray spectra and MET analysis.

The compositions described above may be used for the preparation of species based on at least one rare earth oxide and, optionally, at least on other element selected from among those of groups IVa, VIIa, VIII, Ib, IIb, IIIb, and IVb of the Periodic Table. This preparative technique is carried out by calcination of the aforesaid materials at a temperature sufficient to provide these elements in oxide form. The calcination temperature can also be adjusted and/or selected as a function of the temperature of intended final use of the compositions according to the invention, while taking account of the fact that the specific surface area of the particulate composition decreases as the calcination temperature increases. This calcination operation is generally carried out in the open air, but calcination carried out, for example, under an inert gas is obviously also intended. In actual practice, the calcination temperature is normally limited to a range of values of from 300° to 500° C., and preferably from 350° to 400° C.

A principal advantage of the compositions according to the invention is their ability to provide colloidal solutions or suspensions. These colloidal solutions will now be more fully described.

These solutions are obtained by redispersing the compositions described above in water. To promote the dispersion of these compositions, it may be advantageous to disperse them in an aqueous medium that has been slightly acidified, in particular by means of acetic acid, and that has a pH of about 4. In this manner, colloidal solutions are produced having the following properties.

These solutions are composed of an oxide or oxyhydroxide of the rare earths and, optionally, of another element selected from among those of groups IVa, VIIa, VIII, Ib, IIb, IIIb and IVb of the Periodic Table. These contain colloids whose maximum size is 5 nm and which may range from 2 to 5 nm, when compositions based only on one or a plurality of rare earths are used. In the case of compositions based on at least one rare earth and another element of the type specified above, the maximum colloid size is 10 nm, and preferably 5 nm. This colloid size is measured by Electron Transmission Microscopy (MET).

In addition, the nitrate content of the colloidal solutions as measured with respect to the mass of the colloids is at most 1,000 ppm, preferably at most 200 ppm, and even more preferably at most 100 ppm.

Furthermore, the colloids exhibit a chemical homogeneity such that the ranges of heterogeneity are less than 10 nm². This chemical homogeneity is measured as indicated above (MET-EDAX).

Another advantage of the colloidal solutions according to the invention is their low acidity level. Indeed, they have a pH of at least 3, and, more especially, of from 5 to 8.

The compositions and colloidal solutions according to the invention may be used to prepare catalysts or catalytic compositions that can be used, for example, to treat exhaust gases emanating from internal combustion engines.

In this case, the procedure is as follows. The colloidal solution of the composition is mixed with a carrier, e.g., alumina, titanium, silicon or zirconia. The colloidal solution and the carrier may, for example, be mixed in a wet grinding machine. Catalytically active elements, such as precious metals, may be added before or after mixing. The mixture obtained is then dried and calcined. The calcination operation may be carried out under the same temperature conditions as those indicated above for calcination of the products provided by the precipitation reaction.

Calcination provides a catalytic composition exhibiting several specific properties.

In a first embodiment, the product is a catalytic composition containing at least one rare earth oxide and a carrier of the type indicated above, which forms or defines a matrix in which said rare earth oxide is distributed homogeneously and exists as crystallites having a maximum size of 12 nm. The particle size given relates to a composition obtained after calcination at 800° C. for at most six hours in the open air.

In a second embodiment, the product is a catalytic composition containing at least one rare earth oxide and at least one second oxide selected from among other rare earth oxides and oxides of elements from groups IVa, VIIa, VIII, Ib, IIb, IIIb, and IVb of the Periodic Table, and a matrix-type carrier of the type indicated above. This composition is characterized by the fact that said oxides are distributed homogeneously and are juxtaposed in the carrier.

This homogeneous distribution is measured as described above. More specifically, the homogeneity of the oxide(s) in the carrier is on the order of 10 nm².

By the term "juxtaposed" is intended that, in the case in which the composition comprises several oxides, the latter are juxtaposed within the matrix or carrier, and not dispersed randomly. For example, in the event of two oxides A and B, for each element A, there will be present an element B in close proximity thereto, thereby forming a pair AB, instead of forming any distribution of A and B whatever in the carrier. This characteristic can be demonstrated using MET-EDS analysis.

With respect to the second embodiment indicated above, i.e., for catalytic compositions containing at least one rare earth oxide and at least one oxide of an element of the aforesaid type, the size of said crystallites is at most 15 nm, and, more particularly, at most 10 nm. The particle size reported again applies to a composition obtained after calcination at 800° C. for a maximum of six hours in air.

With respect to the two embodiments described above, the size of the crystallites is determined based on the width at mid-height 1 as a radian of the X-ray diffraction peaks according to Scherrer's law:

$$K\lambda/(\sqrt{1^2-1'^2}) \cos (\Theta)$$

in which $\lambda$ is the wavelength of the beam X ($\lambda_{Cu}$=1.5418 A°), 1' is the purely instrumental width which here equals 0.135°, k is Scherrer's constant, which is here equal to 0.89 considering the width of the peak to be between $-\Delta\theta$ and $+\Delta\theta$. The width at midheight is obtained by deconvolution of the peak (111) according to a pseudo-Voigt law using Profile Fitting software, and is estimated to be correct to a relative error of less than 5%.

Moreover, also with respect to the second embodiment, the oxides, or a majority of same, exist as a solid solution. X-ray analysis indicates the presence of solid solutions.

The amount of rare earth oxide, and, optional, of another oxide in the catalytic composition typically ranges from 10% to 40% by weight of the total composition.

It will be appreciated that, because of the homogeneous distribution of the particles of the oxide(s) in the carrier, the catalytic composition according to the invention possesses a high oxygen-storage capacity.

Lastly, the present invention permits the manufacture of catalysts that are useful for the treatment or conversion of exhaust gases emanating from internal combustion engines and which comprise a substrate and a coating therefor. This substrate may be metallic or a heat-resistant ceramic monolith. The coating may be deposited via conventional "washcoat" techniques from the compositions or suspensions described above.

In order to further illustrate the present invention and the advantages thereof, the following specific examples are given, it being understood that same are intended only as illustrative and in nowise limitative.

In said examples to follow, the dispersibility in water was measured in the following manner: 1 g of dry product was added to a 50 ml volumetric flask, water was added to adjust the volume to 50 ml, and the mixture was stirred for 15 minutes. The suspension produced was centrifuged at 4,500 rev/min for 10 minutes. The mother liquors were then separated from the precipitate, which was dried at 120° C. overnight. Dispersibility is indicated by the ratio (P1–P2)/P1, expressed in % with P1 being the initial mass of 1 g and P2, the weight of the dry residual precipitate. Dispersibility in acidified water was determined via the same operating technique, but the 50 ml suspension was adjusted to a pH of 4 using concentrated acetic acid.

Lastly, measurement by means of quasi-elastic light scattering evidenced that colloids were present in the mother liquors.

EXAMPLE 1

0.5 l of a 3.6M solution of $NH_4OH$ was introduced into a vessel at ambient temperature under vigorous stirring (1,600 rev/min). Employing a rapid drip, 0.5 l of a 0.6M solution of cerium acetate was added. The pH decreased from 11.5 to 9.5 as soon as the cerium III acetate was added. Stirring was continued for 30 minutes after the addition of all of the acetate. The temperature remained at the ambient level. Next, the precipitate obtained by filtration on frit no. 4 was then separated and subjected to plunger washing using 2 l of demineralized water.

The precipitate was dried by freeze-drying for 24 hours or by spraying by means of a Büchi sprayer. In the latter event, the solids extraction temperature was 110° C.

MET analysis indicated that the product obtained had an average elementary crystallite size of 2.5 nm. The nitrate content was 80 ppm.

The composition exhibited 95% dispersibility in water.

The product, when redispersed in demineralized water, gave a colloidal solution whose pH was 5 and in which the colloid size was 4 nm.

EXAMPLE 2

This example relates to the preparation of a composition containing cerium and iron in the respective proportions of 90/10 by weight of oxide.

First, an iron acetate solution was obtained from iron nitrate by precipitation using liquid ammonia having a pH of 7. The precipitate was then washed and resolubilized in acetic acid having a pH of 1.5. A mixture of cerium acetate and iron in solution in a concentration of 70 g/l and having an oxide ratio of 90/10 was obtained. This latter mixture was continuously reacted with a 4M liquid ammonia solution. The solution and liquid ammonia flow rates were 24 ml/mn and 36 ml/mn, respectively. The pH of the reaction medium was constant and was 11. The precipitate obtained was dried using a Büchi sprayer under the same conditions as in Example 1.

The product exhibited a dispersibility in water of 65%.

MET-EDS analysis revealed a heterogeneity of less than 10 $nm^2$.

EXAMPLE 3

This example relates to the preparation of a composition containing cerium/zirconium/iron/praseodymium in the oxide proportions by weight of 82/17.8/0.1/0.1, respectively.

Two liters of a solution were prepared having the following composition:

(i) Cerium acetate: 191 g, (ii) Zirconium acetate: 95.4 g, (iii) Praseodymium acetate: 232.2 g, (iv) Ferric oxide: 181.2 g (v) Pure acetic acid: 200 ml.

The above solution was reacted continuously at a flow rate of 17 ml/mn with a 5M liquid ammonia solution at a flow rate of 28.5 ml/mn. The precipitation pH was constant and was 11. The product was dried using a Büchi sprayer, again under the same conditions.

The product had a nitrate content of 200 ppm and a dispersibility in water of 68%. MET-EDS analysis of the product evidenced a heterogeneity of less than 10 $nm^2$.

By redispersion in water, a colloidal solution having a pH of 4 and a colloid size of 5 nm was obtained.

EXAMPLE 4

This example relates to the preparation of a composition of cerium and lanthanum in the oxide proportions by weight of 80/20, respectively.

A solution containing 135.2 g cerium acetate and 35.1 g lanthanum acetate per liter was prepared.

This solution was reacted continuously at a flow rate of 18 ml/mn with a 4M liquid ammonia solution at a flow rate of 26 ml/mn. The product was dried using a Büchi sprayer, under the same conditions.

The compound obtained had a nitrate content of 70 ppm and a dispersibility in water of 60%. MET-EDS analysis of the product evidenced a heterogeneity of less than 20 $nm^2$.

EXAMPLE 5

This example relates to the preparation of a composition containing cerium/zirconium/yttrium in the oxide ratio by weight of 74/22/4.

A solution of cerium, zirconium, and yttrium acetates in the required proportions was prepared. While stirring at 1,500 rev/min, the solution of acetates was poured into a vessel equipped with counter-blades at a flow rate of 17 ml/mn. A 4M liquid ammonia solution was added at a rate of 25.7 ml/mn. The precipitate was centrifuged, then again placed in suspension and finally dried using a Büchi sprayer, again under the same conditions.

The product obtained had a nitrate content of 90 ppm and a dispersibility in acidified water of 80%. MET-EDS analysis of the product revealed a heterogeneity of less than 10 $nm^2$. When redispersed in water, the compound provided a colloidal solution having a colloid size of 4.5 nm.

EXAMPLE 6

This example relates to the preparation of a composition based on cerium and manganese in the oxide proportions by weight of 90/10.

A solution containing 19.4 manganese acetate and 123.9 cerium acetate was prepared.

This solution was reacted continuously with a 2M sodium carbonate solution. The respective flow rates were 18 and 26 ml/mn. The precipitate was centrifuged, then again placed in suspension and finally dried using a Büchi sprayer, under the same conditions.

The product obtained had a nitrate content of 100 ppm and a dispersibility in acidified water of 87%. MET-EDS analysis of the product revealed a heterogeneity of less than 10 $nm^2$. When redispersed in water, the composition provided a colloidal solution having a colloid size of 4.5 nm.

EXAMPLE 7

This example relates to the preparation of a composition containing cerium and copper in the proportions by weight of oxide of 90/10, respectively.

A solution containing cerium and copper acetates was prepared in the required proportions. This solution was reacted continuously with a 2M sodium carbonate solution employing flow rates of 18 l/mn and 26 l/mn, respectively.

The product obtained was dried using a Büchi sprayer, again under the same conditions. MET-EDS analysis of the product revealed a heterogeneity of less than 10 $nm^2$.

EXAMPLE 8

This example relates to the preparation of a composition containing cerium and zirconium in the proportions by weight of oxide of 82/18, respectively.

A solution of cerium chloride and zirconyl chloride in the required proportions was prepared. It was reacted continuously while stirring at 700 rev/min with a 4M liquid ammonia solution employing flow rates of 20 and 11 ml/m, respectively. The pH of the reaction medium was constant and was 10.1. The precipitate obtained was dried using a Büchi sprayer as above and under the same conditions. The product had a dispersibility in acidified water of 51%. MET-EDS analysis of the product revealed a heterogeneity of less than 10 $nm^2$.

EXAMPLE 9

This example relates to the preparation of a catalytic composition according to the invention.

A mixture was formulated containing 30% by weight of solids composed of 20% cerium and zirconium oxides and obtained via the procedure of Example 4 (in respective proportions of oxides of 80/20 and having a dispersibility in acidified water of 95%) and of 80% Versal 250 alumina aged for six hours at 700° C. and having a surface area of 190 $m^2/g$. The suspension further comprised 1% acetic acid relative to the solids. 3 l of this mixture were vigorously stirred, then wet-ground in a ball-type grinding mill. This mill had a one-liter volume and was charged with 800 ml alumina beads having a diameter of 0.4 to 0.6 mm. The mixture was introduced at the rate of 13 l/h. The average size of the particles of the mixture decreased from 10 to 5 µm after grinding.

The mixture was air-dried at 120° C. for twelve hours, and the dried product was calcined at 1,050° C. in air for six hours.

The size of the crystallites of the oxides in the alumina was 11 nm. X-ray analysis evidenced that the cerium and zirconium were present in the form of a solid solution of the zirconium in the cerium.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Finely divided particulates of a composition of matter comprising:

at least one rare earth compound and, optionally, at least one compound of at least one other element selected from among those of groups IVa, VIIa, VIII, Ib, IIb, IIIb and IVb of the Periodic Table;

said finely divided particulates being derived, at least in part, by contacting a solution of at least one rare earth acetate or rare earth chloride with a basic liquid medium, the composition of said finely divided particulates including anions of said at least one rare earth acetate or rare earth chloride; and said particulates being at least 50% dispersible in water having a pH of at least 4 and said particulates comprising no greater than 1,000 ppm of nitrate values.

2. The finely divided particulates as defined by claim 1, said particulates being at least 60% dispersible in water.

3. The finely divided particulates as defined by claim 1, said particulates being at least 80% dispersible in acidified water.

4. The finely divided particulates as defined by claim 1, said at least one rare earth compound comprising a compound of cerium, yttrium, neodymium, gadolinium and/or praseodymium.

5. Finely divided particulates of a composition of matter comprising at least one rare earth oxide and at least one other oxide selected from among a rare earth oxide and an oxide of an element of groups IVa, VIIa, VIII, Ib, IIb, IIIb, and IVb of the Periodic Table, said particulates being derived, at least in part, by contacting a solution of at least one rare earth acetate or rare earth chloride with a basic liquid medium, said particulates being at least 50% dispersible in water having a pH of at least 4 and said particulates comprising no greater than 1,000 ppm of nitrate values.

6. Finely divided particulates of a composition of matter comprising at least one rare earth compound and at least one compound of zirconium, iron, copper, manganese, gallium and/or palladium, said particulates being derived, at least in part, by contacting a solution of at least one rare earth acetate or rare earth chloride with a basic liquid medium, said particulates being at least 50% dispersible in water having a pH of at least 4 and said particulates comprising no greater than 1,000 ppm of nitrate values.

7. The finely divided particulates as defined by claim 1, comprising at least one rare earth oxide or oxyhydroxide and an anion of a rare earth precursor thereof.

8. Finely divided particulates as defined by claim 1, wherein said particulates are essentially free of moisture.

9. The finely divided particulates as defined by claim 1, comprising no greater than 200 ppm of nitrate values.

10. The finely divided particulates as defined by claim 9, comprising no greater than 100 ppm of nitrate values.

11. The finely divided particulates as defined by claim 1, having a particle size ranging from 1 to 10 µm.

12. The finely divided particulates as defined by claim 1, comprising a solid solution of said at least one compound(s).

13. The finely divided particulates as defined by claim 1, having a chemical homogeneity such that the ranges of heterogeneity thereof are less than 10 $nm^2$.

14. A catalyst composition comprising a matrix carrier material, said matrix carrier material having a catalytically effective amount of the finely divided particulates as defined by claim 1 homogeneously distributed therethrough.

15. A catalyst composition comprising a matrix carrier material, said matrix carrier material having a catalytically effective amount of the finely divided particulates as defined by claim 5 homogeneously and juxtaposedly distributed therethrough.

16. The catalyst composition as defined by claim 14, said matrix carrier material comprising alumina, titanium, zirconia or silica.

17. The catalyst composition as defined by claim 15, said matrix carrier material comprising alumina, titanium, zirconia or silica.

18. The catalyst composition as defined by claim 14, said finely divided particulates having a maximum particle size of 12 nm after calcination at 800° C. for 6 hours.

19. The catalyst composition as defined by claim 15, said finely divided particulates having a maximum particle size of 15 nm after calcination at 800° C. for 6 hours.

20. A catalyst comprising the finely divided particulates as defined by claim 1.

21. The catalyst as defined by claim 20, comprising a substrate coated with said finely divided particulates.

22. A process for the preparation of the finely divided particulates of a composition of matter comprising at least one rare earth compound and, optionally, at least one compound of at least one other element selected from among those of groups IVa, VIIa, VIII, Ib, IIb, IIIb and IVb of the Periodic Table, said particulates being at least 50% dispersible in water having a pH of at least 4, comprising (a) providing a solution of at least one rare earth acetate or chloride and, optionally, of at least one salt or colloidal solution of at least one other element selected from among those of groups IVa, VIIa, VIII, Ib, IIb, IIIb and IVb of the Periodic Table, (b) intimately contacting said solution with a basic liquid medium and maintaining basic the pH of the reaction medium thus formed, and (c) recovering the precipitate which forms, the recovering being carried out by atomization or freeze-drying.

23. The process as defined by claim 22, comprising maintaining the pH of said reaction medium at a value ranging from 9 to 11.

24. The process as defined by claim 22, said basic liquid medium comprising an ammonia solution.

25. The process as defined by claim 22, further comprising calcining the precipitate thus recovered.

26. Finely divided particulates as defined by claim 1, said particulates being dry particulates that are essentially-free of moisture, and said dry particulates having a particle size of 1–10 μm.

27. Finely divided particulates as defined by claim 5, said particulates being dry particulates that are essentially free of moisture, and said dry particulates having a particle size of 1–10 μm.

28. Finely divided particulates as defined by claim 6, said particulates being dry particulates that are essentially-free of moisture, and said dry particulates having a particle size of 1–10 μm.

29. Finely divided particulates as defined by claim 5, wherein said at least one rare earth oxide and said at least one other oxide comprise a solid solution.

30. Finely divided particulates as defined by claim 6, wherein said at least one rare earth compound and said at least one compound of zirconium, iron, copper, manganese, gallium and/or palladium comprise a solid solution.

31. Finely divided particulates as defined by claim 1, wherein said particulates exist as a kernel comprising oxides of said at least one rare earth compound, oxyhydroxides of said at least one rare earth compound, or a combination thereof; and said kernel is surrounded by anions of said at least one rare earth acetate or rare earth chloride.

32. Finely divided particulates as defined by claim 31, wherein said kernel comprises an oxyhydroxide and said oxyhydroxide is an oxyhydroxyacetate or oxyhydroxychloride or a combination thereof.

33. Finely divided particulates as defined by claim 5, wherein said particulates exist as a kernel comprising said at least one rare earth oxide, said at least one other oxide, or a combination thereof; and said kernel is surrounded by anions of said at least one rare earth oxide and said at least one other oxide.

34. Finely divided particulates as defined by claim 6, wherein said particulates exist as a kernel comprising oxides of said at least one rare earth compound and of said at least one compound of zirconium, iron, copper, manganese, gallium and/or palladium; oxyhydroxides of said at least one rare earth compound and of said at least one compound of zirconium, iron, copper, manganese, gallium and/or palladium; or a combination thereof, and said kernel is surrounded by anions of said at least one rare earth compound and anions of said at least one compound of zirconium, iron, copper, manganese, gallium and/or palladium.

\* \* \* \* \*